(12) United States Patent
Bauer et al.

(10) Patent No.: US 11,712,719 B2
(45) Date of Patent: Aug. 1, 2023

(54) SELF-CLEANING SCREEN

(71) Applicant: MAJOR WIRE INDUSTRIES LIMITED, Québec (CA)

(72) Inventors: Peter Bauer, Quebec (CA); Yves Brouillette, Quebec (CA); Patrick Rousson, Quebec (CA); Bernard Betts, Quebec (CA)

(73) Assignee: MAJOR WIRE INDUSTRIES LIMITED

( * ) Notice: Subject to any disclaimer, the term of this patent is extended or adjusted under 35 U.S.C. 154(b) by 0 days.

(21) Appl. No.: 17/632,677

(22) PCT Filed: Aug. 5, 2019

(86) PCT No.: PCT/CA2019/051071
§ 371 (c)(1),
(2) Date: Feb. 3, 2022

(87) PCT Pub. No.: WO2021/022353
PCT Pub. Date: Feb. 11, 2021

(65) Prior Publication Data
US 2022/0314280 A1    Oct. 6, 2022

(51) Int. Cl.
*B07B 1/46* (2006.01)
*B07B 1/50* (2006.01)

(52) U.S. Cl.
CPC ............ *B07B 1/4618* (2013.01); *B07B 1/50* (2013.01)

(58) Field of Classification Search
CPC ............ B07B 1/46; B07B 1/4618; B07B 1/50
USPC ......................................................... 209/379
See application file for complete search history.

(56) References Cited

U.S. PATENT DOCUMENTS 8,893,894 B2 * 11/2014 Steadman ............. B07B 1/4672
209/403

FOREIGN PATENT DOCUMENTS

| CA | 2710695 | | 1/2011 | |
|---|---|---|---|---|
| CA | 2710695 A1 | * | 1/2011 | ........... B07B 1/4618 |
| CN | 108311382 | | 7/2018 | |
| CN | 114340876 A | * | 4/2022 | .............. B22F 10/31 |

OTHER PUBLICATIONS

Patent Cooperation Treaty (PCT), International Search Report and Written Opinion for Application PCT/CA2019/051071 filed Aug. 5, 2019, dated Apr. 22, 2020, International Searching Authority, CA.

* cited by examiner

*Primary Examiner* — Terrell H Matthews
(74) *Attorney, Agent, or Firm* — McDonald Hopkins LLC

(57) ABSTRACT

A self-cleaning screen is formed via additive printing. The dimensions of the self-cleaning screen are modified. Supports are printed via additive printing. The supports are formed over a plurality of wires. Side seals may be additively printed along major sides of the plurality of wires. Wear of the screens is monitored.

20 Claims, 9 Drawing Sheets

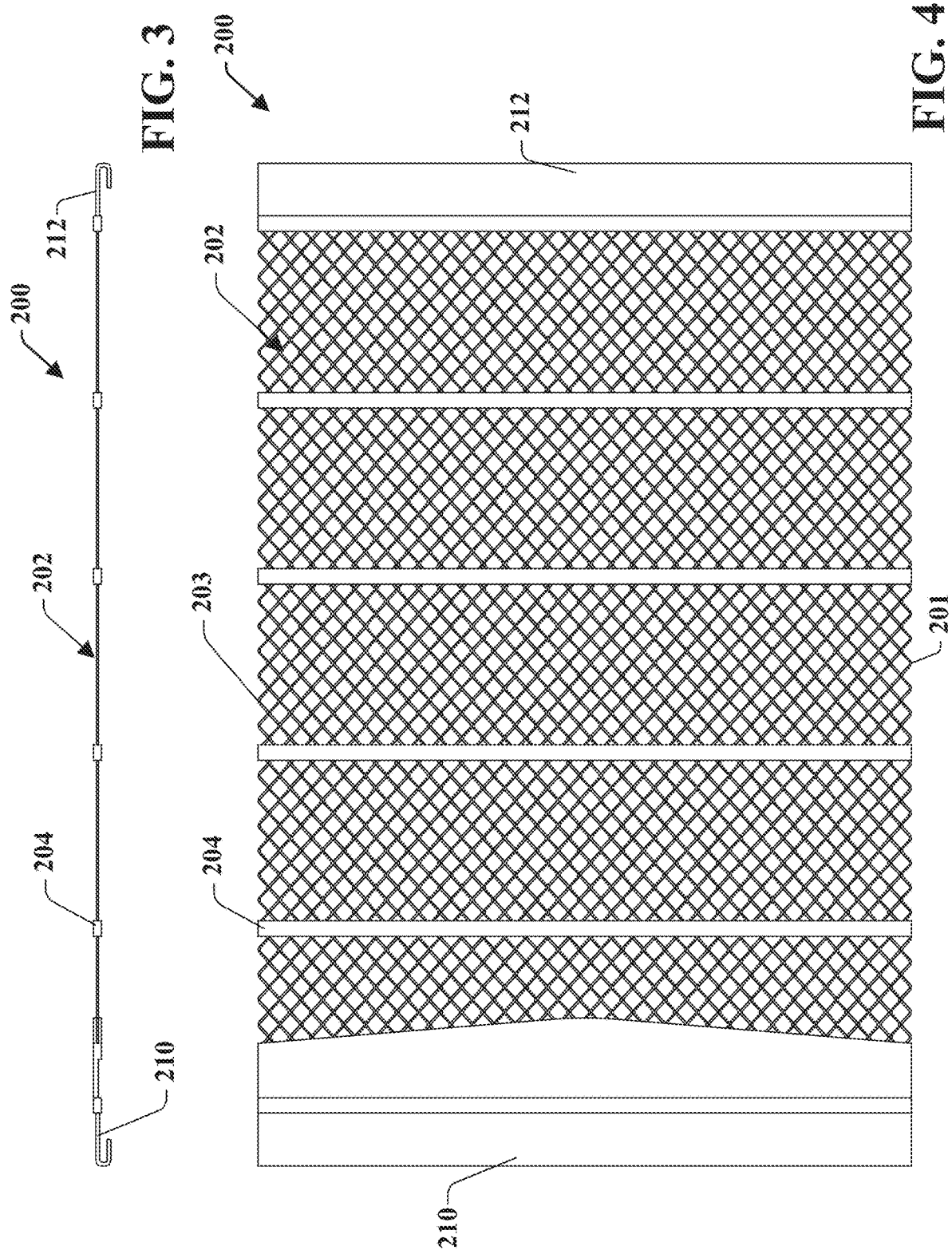

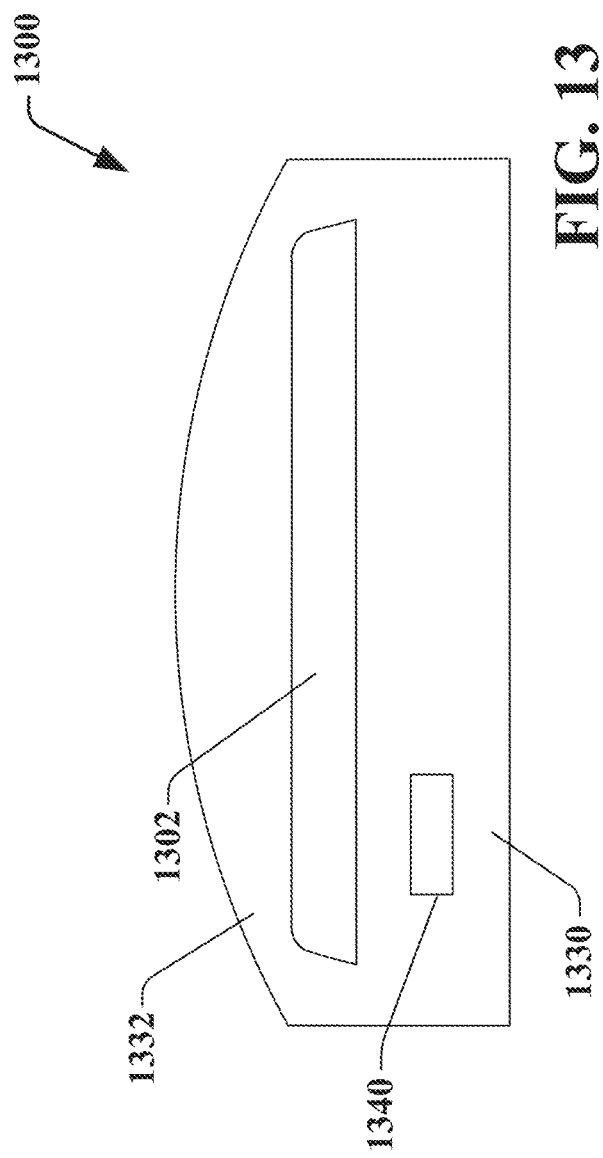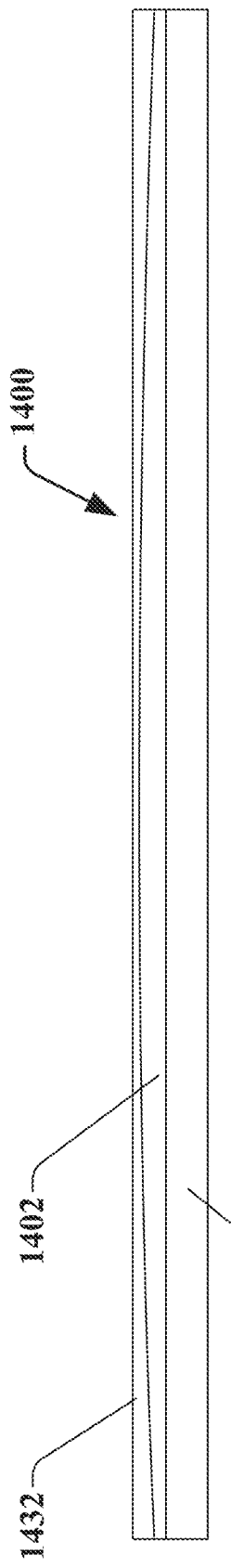

SELF-CLEANING SCREEN

CROSS-REFERENCE TO RELATED APPLICATION

This application is a 35 U.S.C. § 371 national stage application of PCT Application No. PCT/CA2019/051071 filed Aug. 5, 2019, which is incorporated in its entirety by reference.

TECHNICAL FIELD

This disclosure relates to a wire screen system and methods of making a wire screen system, and more specifically, a self-cleaning wire screen and methods of making wire self-cleaning is described herein.

BACKGROUND

Vibrating screens are used to separate particles by shape or size. These screens are used in a variety of industrial applications, such as construction, drilling or mining. Traditionally, the screens mount onto a vibrating deck. A machine moves the deck and screen to cause a vibrating motion. Rapid vibration causes some particles or materials to pass through openings of the screen, while larger particles cannot pass through the openings. The openings can be different sizes from screen to screen. For example, screens can be stacked so that a material can be separated into multiple sizes. The screens can be made of wires woven together. These wires are subject to repeated impact from the particles as they vibrate on the screens. This leads to regular replacement and maintenance of screens.

Self-cleaning screens typically are replaced less often and require less maintenance. Self-cleaning screens use individual wires arranged generally parallel to each other. The wires are mounted in a frame with supports that attach to each wire. For example, supports are arranged perpendicular to the parallel wires. The supports can comprise woven wires or polymer slats of strips. These polymer slats can be made from multiple pieces that are positioned above and below the wires. The pieces are then joined through adhesives, welding, or heating. Other polymer slats can be molded over the wires. These methods take considerable time and effort to create.

The supports for self-cleaning screens hold the wires in position but allow the wires to move independent of each other and separate from each other. This allows machines to shake particles loose so that the screen does not become clogged. In contrast, wires in woven screens move together and are subject to increased clogging.

There is a need for a more efficient system and method of producing self-cleaning screens. Moreover, there is a need for increased versatility and variety of supports and spacing for screens. Various other needs may be apparent throughout this disclosure.

SUMMARY

The following presents a summary of this disclosure to provide a basic understanding of some aspects. This summary is not intended to identify key or critical elements or define any limitations of embodiments or claims. Furthermore, this summary may provide a simplified overview of some aspects that may be described in greater detail in other portions of this disclosure.

Disclosed is a method of manufacturing a self-cleaning screen, comprising, generating a three-dimensional model for at least one support, transmitting instructions to an additive printer to form a first layer of the at least one support, positioning a plurality of wires on the at least one support, and, transmitting instructions to the additive printer to form a second layer of the at least one support. The method may comprise modifying the three dimensional model based on at least one of user instructions or a history of performance associated with the self-cleaning screen. The instructions that are transmitted to the additive printer to form the first layer and the second layer of the at least one support may cause the additive printer to form the at least one support with an overlay. The at least one support may comprise a horizontal support. The at least one support comprises a vertical support. The method may further comprise forming at least two second layers of different supports of the at least one support without moving the plurality of wires. The plurality of wires may be arranged to provide gaps between the plurality of wires. The method may comprise positioning at least one sensor in the at least one support. The at least one sensor monitors for damage to the at least one support. The method may further comprise transmitting instructions to the additive printer to form a third layer of the at least one support, wherein the third layer comprises a different material from the first and second layer.

A self-cleaning screen is described herein. The self-cleaning screen may comprise a plurality of wires operatively positioned generally parallel to each other, wherein the plurality of wires comprises a first major side, a second major side, a proximal end, and a distal end, at least one additively printed support extending from the first major side to the second major side, and at least one additively printed seal extending along at least one of the first major side and the second major side, wherein the at least one additively printed seal extends from the proximal end to the distal end. The self-cleaning screen may further comprise at least one fastener operatively positioned at the proximal end or the distal end. The at least one additively printed support may comprise a top surface comprising at least one of a curved or angled portion. The at least one additively printed support may comprise at least two different materials. The at least one additively printed support may comprise at least two different materials. The self-cleaning screen may further comprise a colored layer disposed within the at least one additively printed support, wherein the colored layer comprises a different color than other portions of the at least one additively printed support.

Also described is a self-cleaning screen comprising a plurality of crimped wires; and a plurality of additively printed horizontal supports, wherein the additively printed horizontal supports comprise a bottom layer, a middle layer, and a top layer. The top layer and the bottom layer may comprise polyurethane. The middle layer may comprise a plastic material comprising a different stiffness as the top layer and the bottom layer. The self-cleaning screen may further comprise at least one side seal disposed along a major edge of the plurality of crimped wires.

The foregoing embodiments are merely exemplary of some of the aspects of the system. Additional features and elements may be contemplated and described herein. Also, features from one of the foregoing embodiments may be combined with features from any of the other foregoing embodiments.

DESCRIPTION OF THE DRAWINGS

FIG. 3 is a side view of the additively printed self-cleaning screen of FIG. 2 in accordance with the present disclosure;

FIG. 4 is a top plan view of the additively printed self-cleaning screen of FIG. 2 in accordance with the present disclosure;

FIGS. 10-14 are cross-sectional views of a support of an additively printed self-cleaning screen.

DETAILED DESCRIPTION

Figure 1:
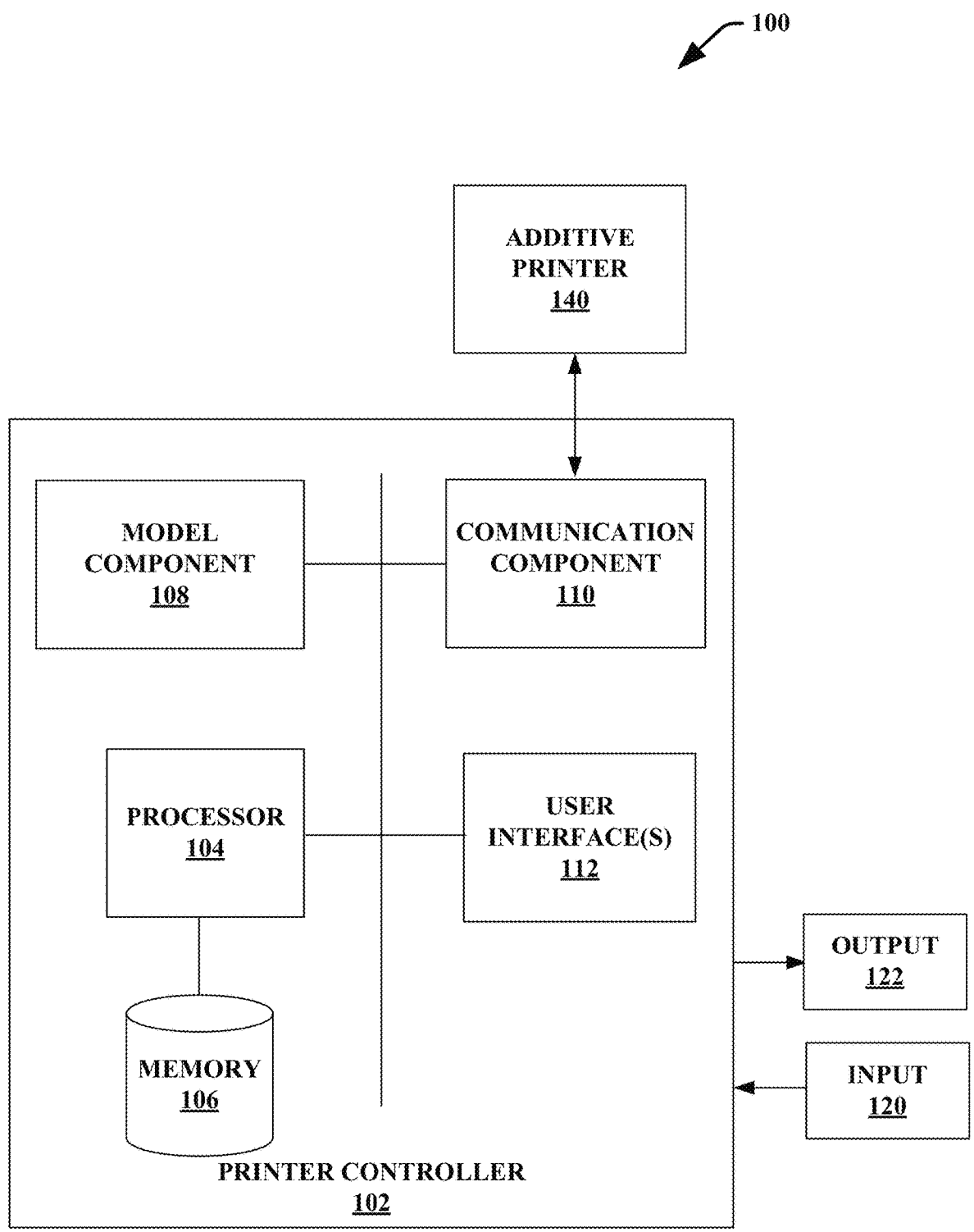
FIG. 1 is a functional schematic diagram of an additive printing system of the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). As such, embodiments may describe a user action that may not require human action.

Embodiments described herein may utilize networks or communication networks, such as to control three-dimensional printing devices, communicate plans or models, or the like. Networks or communication networks may include wired or wireless data connections to a network (e.g., Ethernet, Wi-Fi, cellular network, local area connections, etc.). Embodiments, for example, may utilize various radio access network (RAN), e.g., Wi-Fi, Wi-Fi direct, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. BLUETOOTH (in any of its various iterations), various wireless technologies for exchanging data over short distances (e.g., ZigBee, RuBee, DASH7, etc.), and other protocols and personal area networks may be utilized. Wireless communication may also include, in whole or in part, communications transmitted over more traditional local area networks (including such networks provided by the vehicle and/or trailer/towed product) or cellular data networks, so as to incorporate aspects of cloud-based computing systems, information available via world wide web and other internet connectivity, and the like. As such, any indication of "wireless," "Wi-Fi," or other similar terminology should be read expansively (at least within the context it is used) throughout this disclosure. Moreover, embodiments may use one or more different communications protocols or devices (whether wired or wireless) to communicate between the various components of the system.

"User equipment," "device," "user equipment device," "client," and the like are utilized interchangeably in the subject application, unless context warrants particular distinction(s) among the terms. By way of example, user equipment may comprise an electronic device capable of sending and receiving data. A user equipment device may have a processor, a memory, a transceiver, an input, and an output. Examples of such devices include cellular telephones (e.g., smart phones), personal digital assistants (PDAs), portable computers, tablet computers (tablets), desktop computers, wearables (e.g., smart watches), and the like.

Disclosed embodiments may refer to additive manufacturing, additive deposition, or three-dimensional (3-D) printing. Such terms are used interchangeably to describe vat photopolymerization, material jetting, binder jetting, powder bed fusion, material extrusion, directed energy deposition, sheet lamination, powder deposing procedures, fused filament deposition, liquid deposition, fused granular deposition, or the like, unless context suggests otherwise or distinguishes among such terms. Such processes generally include a computing device that executes instructions to form a three-dimensional object from a computer design. Material, such as a polymer, is deposited in small amounts at a time to form a desired shape.

In contrast, injection molding processes utilize pre-designed cavities or molds. A molten material is injected into the mold to form a desired shape. In other examples, material is deposited and then pressed into place by a mold. This requires a manufacturer to move the screens and/or equipment while forming supports. Other examples require multiple extruders and molds. The molds limited the dimensions of resulting screens and supports. New molds must be created if any changes are desired. Furthermore, injection molding often requires time consuming placement of wires, positioning and adjustments. Traditional self-cleaning screens are custom-made in small batches or lots for particular applications or machinery. This means that many different molds are required for the different screens.

Described herein are self-cleaning screens comprising three-dimensionally printed supports or slats. The screens may comprise wires made of a desired material, such as metals or metal alloys. The three-dimensionally printed supports may comprise a thermoplastic (e.g., polyurethane). The supports may be formed via additive manufacturing. This allows a significantly increased degree of freedom for design to production. It is further noted that manufactures may create or add new features to be produced with reduced or no additional setup. For instance, embodiments may allow for formation of supports in different orientations (e.g., parallel, perpendicular, irregularly spaced, etc.) without requiring additional set up. As an example, traditional molding or die pressing requires reorienting the screen being constructed with the die on a different axis. This often requires a mechanical set-up to change the geometry of a flexible polymer strip (such as the thickness, width or the profile).

The systems and methods described herein allow for geometry (e.g., size, shape, thickness, width, profile, etc.) of supports and orientation (e.g., position relative the wires) to be programed and controlled without rearranging of an additive printing machine. In another aspect, described embodiments may allow for more complex or varied combinations of materials (e.g. different plastics) in comparison to molding or die pressing supports. Additive printing may allow for combining the materials without setup changes or different machines (e.g. changing the color at a certain height of the strips to indicate a certain wear level). A change to a different height requires only a parameter change instead of a new die for a new strip.

While examples may describe one or more components formed through additive printing, it is noted that embodiments may include a combination of additive printing and other processes, such as injection molding or the like. For example, one or more horizontal or vertical supports may be formed through additive printing while at least one of a horizontal or vertical support is formed via other manufacturing processes.

Turning now to FIG. 1, there is a functional block diagram of an additive printing system 100 for manufacturing a self-cleaning screen in accordance with various disclosed embodiments. As described herein, the additive printing system 100 may generate supports around or onto wires to form a screen.

Additive printing system 100 may primarily include a printer controller 102 in communication with an additive printer 140. The printer controller 102 may generally comprise a processor 104, a memory 106, a model component 108, a communication component 110, and user interface(s) 112. It is noted that memory 106 may store computer executable instructions which may be executed by processor 104. In an aspect, instructions may include instructions that control or instruct the various components and process models to control the additive printer 140, or the like. Furthermore, while embodiments may reference user actions, it is noted that users (e.g., humans, etc.) may not be required to perform such actions. Moreover, embodiments may, for simplicity of explanation, describe components as separate from each other or performing disparate functions. As such, it is noted that multiple components may be a single device or multiple devices.

The additive printer 140 may comprise one or more extruders and material to be extruded. The one or more extruders may be oriented in an appropriate manner, such as vertically relative a wire screen. Moreover, the extruders may be movable about three directions, such as in an X-, Y-, and Z-axis. It is noted that the additive printer 140 may use different mechanisms (e.g., rails, motors, etc.) to maneuver in a particular axis. In another aspect, the additive printer 140 may utilize cartesian and delta based printers so that the extruder and a print bed may be movable relative each other in three axes. As an example, the extruder may be movable along the X-axis and the Z-axis, while the print bed moves in and out along the Y-axis. It is further noted that other appropriate additive printers may be utilized.

User interface(s) 112 may comprise input or output devices as described herein. For example, the user interface(s) 112 may include input/output devices, display screens, audio input or output devices, and the like. The user interfaces(s) 112 may be coupled to the processor 104 to communicate information to or from a user. For example, the user interface(s) 112 may include a display that is controlled by the processor 104 to generate output 122 in the form of graphical information. In another instance, the user interface(s) 112 may include an input/output device that receives input 120 from a user and transmits the input to 120 to the processor 104 (e.g., adjust design dimensions, etc.). In at least some embodiments, the user interface 112 may comprise a user device, such as a mobile communication device (e.g., smart phone, tablet computer, wearable device, etc.).

Communication component 110 may comprise one or more communication devices that may receive input 120 and transmit output 122. The communication component 110 may comprise hardware, software, and/or a combination of hardware and software. According to embodiments, the communication component 110 may comprise electrical circuitry that facilitates wired or wireless communication. For example, the communication component 110 may comprise a BLUETOOTH® transmitter/receiver. In another example, the communication component 110 may comprise a wire jack, such as an Ethernet connector, USB port, or the like. It is noted that the communication component 110 may include a device that may be disposed within a housing of the printer controller 102 or may be an external device connected to the printer controller 102. The communication component 110 may allow the printer controller 102 to communicate with the additive printer 140 or with other devices, such as an administrative work station, remote work station, or remote storage connected to a network.

The model component 108 may edit, create, store, or otherwise generate three-dimensional models to be extruded from the additive printer 140. In embodiments, the model component 108 may display or render a model of a self-cleaning screen via the user interface(s) 112. The model may comprise a computer-generated rendering of a self-cleaning screen. In an aspect, the model may include wires and support structures. The wires may represent crimped or other wires onto which the support structures are to be printed. In another example, the model component 108 may provide a graphical interface that may allow a user to modify or adjust geometric dimensions of the support structures or other objects to be printed, such as thickness, width, profile (e.g., shape), length, orientation, and the like. In other embodiments, the model component 108 may allow for overlap or overlay of supports. The overlay may be modified (e.g., lengthened or shortened) as desired.

The object to be printed may comprise horizontal supports (e.g., strips, protective strips, or other supports that are perpendicular to wires), overlaps (supports that are parallel to the wires), side seals (e.g., supports that are parallel to the wires and located at an edge of a set of wires), and attachment items (e.g., hooks, fastening structures, loops, etc.). It is noted that a user may add, remove, or otherwise modify objects for a particular model as desired. It is further noted that a user may provide instructions that describe an order in which objects are to be printed as described herein. For example, a user may provide input that identifies a first or bottom portion of supports to be printed. After printing this bottom portion, wires may be attached to supports, and a top layer may be printed.

The model component 108 may provide graphical controls to allow for ease of modification. As described herein, this may allow a user to create or modify designs without requiring retooling, formations of new molds, mechanical alterations to machines, or the like.

In an aspect, model component 108 (as well as other components of system 100) may utilize artificial intelligence, statistical models, or other processes and/or algorithms. In embodiments, model component 108 may utilize classifiers that map an attribute vector to a confidence that the attribute belongs to a class. For instance, model component 108 may input attribute vector, x=(x1, x2, x3, x4, xn) mapped to f(x)=confidence (class). Such classification can employ a probabilistic and/or statistical based analysis (e.g., factoring into the analysis affinities and ingredient attributes) to infer an action or modification to be automatically performed. In various embodiments, model component 108 may utilize other directed and undirected model classification approaches including, e.g., naïve Bayes, Bayesian networks, decision trees, neural networks, fuzzy logic models, and probabilistic classification models providing different patterns of independence. Classification may also include statistical regression that is utilized to develop models of priority.

In accordance with various aspects of the subject specification, an example embodiment may employ classifiers that are explicitly trained (e.g., via a generic training data) as well as implicitly trained (e.g., via observing screen performance, simulated wear, user preferences, historical information, receiving extrinsic information). For example, support vector machines may be configured via a learning or training phase within a classifier constructor and feature selection module. Thus, the classifier(s) may be used to automatically learn and perform a number of functions, including but not limited to determining modifications to dimensions of the supports, a number of supports, placement of supports, and the like. This learning may be on an individual basis, i.e., based solely on a single user, machine, or application, or may apply across a set of or the entirety of the user base. Information from the users may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user.

Reference will now be made to various other figures in view of what has been described herein. It is noted that like named objects or components may refer to similar or the same components unless context suggests otherwise or a particular distinction is made. Moreover, particular acts or functions may be performed by components of system 100 or other components of described embodiments.

Figure 2:
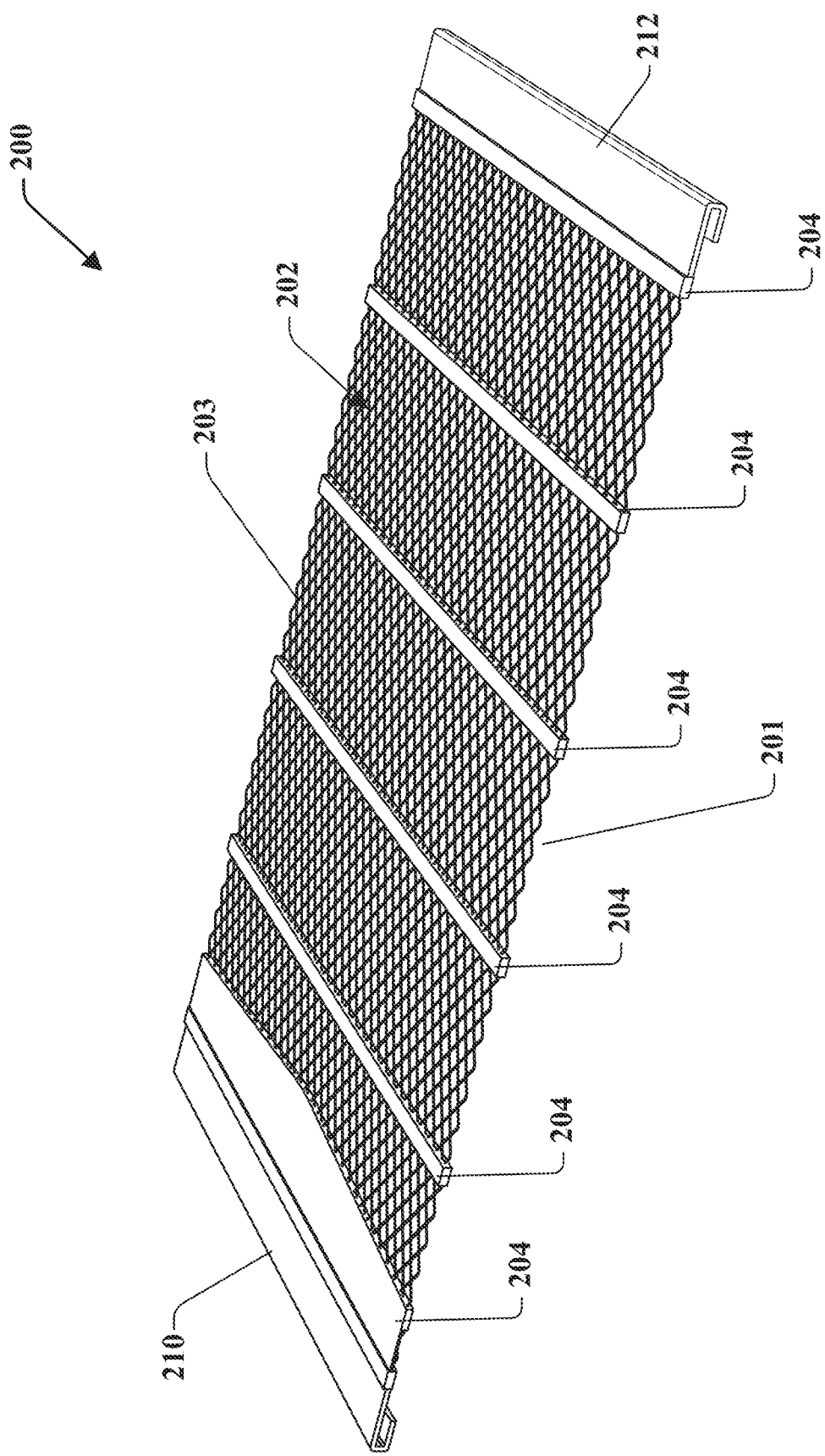
FIG. 2 is a perspective view of an embodiment of an additively printed self-cleaning screen in accordance with the present disclosure.
Figure 5:
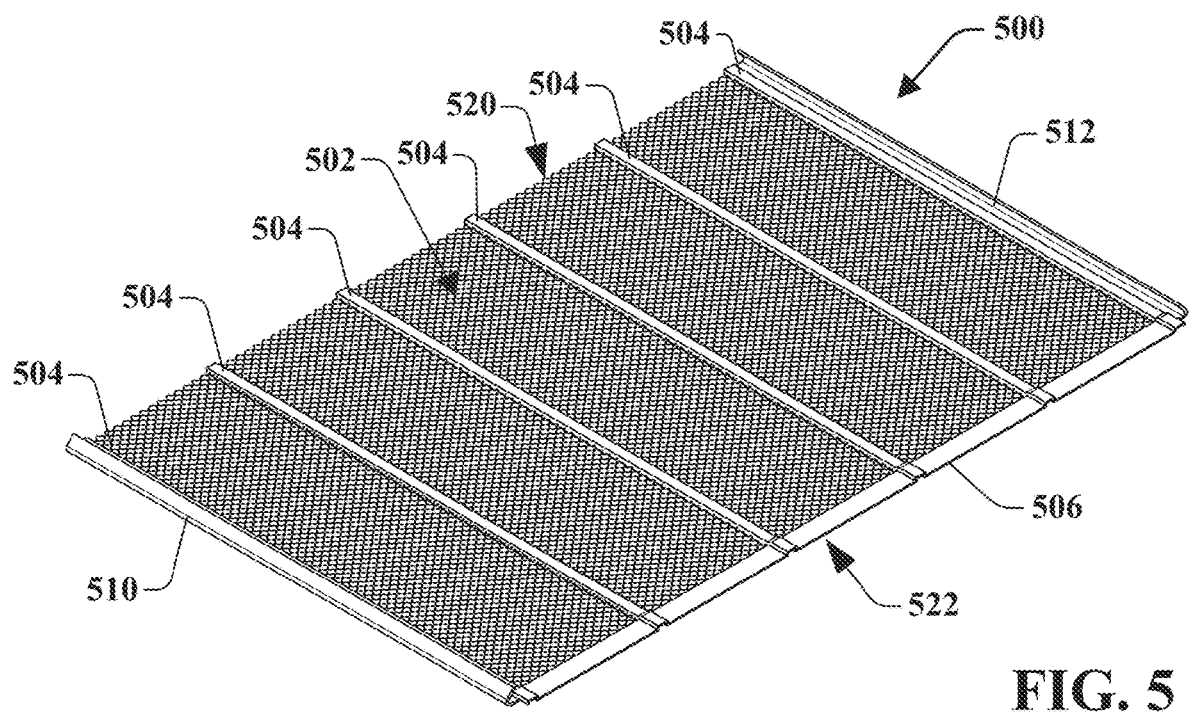
FIG. 5 is a perspective view of an embodiment of an additively printed self-cleaning side torsion screen in accordance with the present disclosure.
Figure 6:
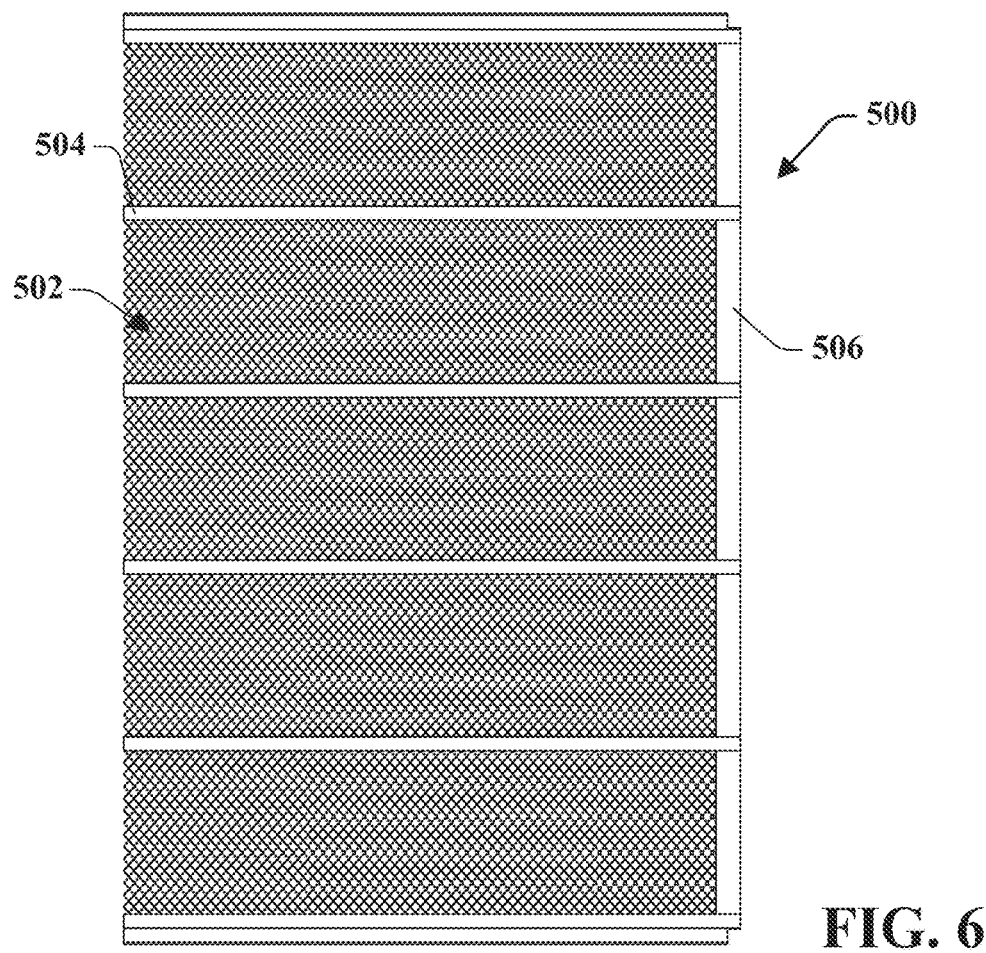
FIG. 6 is a top plan view of the additively printed self-cleaning screen of FIG. 5 in accordance with the present disclosure.

Turning now to FIGS. 2-4, there is an exemplary three-dimensional model of a self-cleaning screen 200. The screen 200 may comprise an end-tensioned screen. It is noted that other types of screens may include or apply aspects described herein, such as shown in FIGS. 5-6. The screen 200 may primarily comprise a plurality of wires 202 arranged generally parallel to each other. The screen 200 may comprise wires which are held in place by horizontal supports 204. In at least some embodiments, the screen 200 may include fasteners 210 and 212 that may fasten the screen to a machine.

The plurality of wires 202 may comprise crimped wires which are held in place by the perpendicular or horizontal supports 204 that generally span from a first side 201 of the screen 200 to a second side 203 of the screen 200. The spacing between the wires may be adjusted according to a desired application. In another aspect, the orientation and dimensions of the crimps, thickness and shape of the wire, and other parameters of the plurality of wires 202 may be appropriately selected. It is noted that the dimensions may be entered into an interface, stored in memory, or the like. In some embodiments, the dimensions may be scanned via imaging devices or sensors.

The horizontal supports 204 may be generally perpendicular (e.g., within −10 to +10 degrees of perpendicular) to the plurality of wires 202 such that each horizontal support 204 contacts each wire of the plurality of wires 202. In various embodiments, modifications to angels can be made through adjusting a parameter for three-dimensional deposition at different angles. It is noted that the horizontal supports 204 may be generally parallel with each other or may be non-parallel. In at least some embodiments, the horizontal supports 204 may be generally equally spaced apart from each other or may be at different distances from each other. A user may modify the dimensions, locations, and orientations of the horizontal supports 204 as described herein. As described herein, additive printing allows for experimentation and variations without requiring new molds. As such, horizontal supports 204 may be made more complex. While referred to as "horizontal," the horizontal supports 204 generally span from side 201 to 203 but may not be straight or perpendicular to the sides 201 and 203.

The screen 200 may include fasteners 210 and 212. The fasteners 210 and 212 may comprise hooks, loops, or other formations as appropriate for application to a vibrating machine. It is noted that the dimensions of the fasteners 210 and 212 may be present or preprogrammed based on a machine to which the screen 200 is to be attached. Moreover, the fasteners 210 and 212 may comprise thermoplastic material, metal, or other materials. It is noted that the fasteners 210 and 212 may be formed of metal or other materials. While the fasteners 210 and 212 may be formed via additive printing, the fasteners 210 and 212 may be formed of other techniques. For instance, the fasteners 210 and 212 may be appropriately shaped to attach to specific machines. Thus, the shape of the fasteners 210 and 212 may be predetermined and may not need to be changed from screen to screen.

FIGS. 5-6 illustrate a screen 500 that may include a plurality for wires 502, horizontal supports 504, side seals 506, and fasteners 510 and 512. It is noted that components of screen 500 may comprise similar or different aspects as those of screen 200. For example, horizontal supports 204 may comprise similar aspects as horizontal supports 504. In an aspect, the screen 500 may comprise a side torsion screen.

The side seals 506 may provide supports that are generally parallel to the plurality for wires 502 and generally perpendicular to the horizontal supports 504. As shown, the side seal 506 may be disposed along a major edge 520 of the plurality for wires 502. Moreover, the side seals 506 may be disposed on one or both major edges 520 and 522. It is further noted that the side seal 506 may be of unitary construction or may be formed of multiple pieces. According to some embodiments, the side seal 506 may be of unitary construction with one or more of the horizontal supports 504. As described herein, a user may edit a model in various ways such that an additive printer may print the model according to a desired specification. Moreover, a user may experiment with different models without having to generate new molds, tooling, or mechanically change molding devices. While shown as comprising a side seal 506 on major edge 522, it is noted that embodiments may include a side seal on major edge 520. In an aspect, a single side seal 506 is shown to illustrate the relative positioning.

It is noted that the side seal 506 may provide or support the wires 502 to add rigidity. In another aspect, the side seal 506 may be formed over one or more wires. In at least one embodiment, the major edge 522 may include a crimped wire that is partially or completely encapsulated by the side seal 506 and the horizontal supports 504. In some examples, the side seal 506 may completely encapsulate the wire, encapsulate more than one wire, or the like. As described here as well as elsewhere in this specification, the dimensions of the horizontal support may be easily modified by a user via the additive printing techniques, methods, and systems of the present disclosure.

Figure 7:
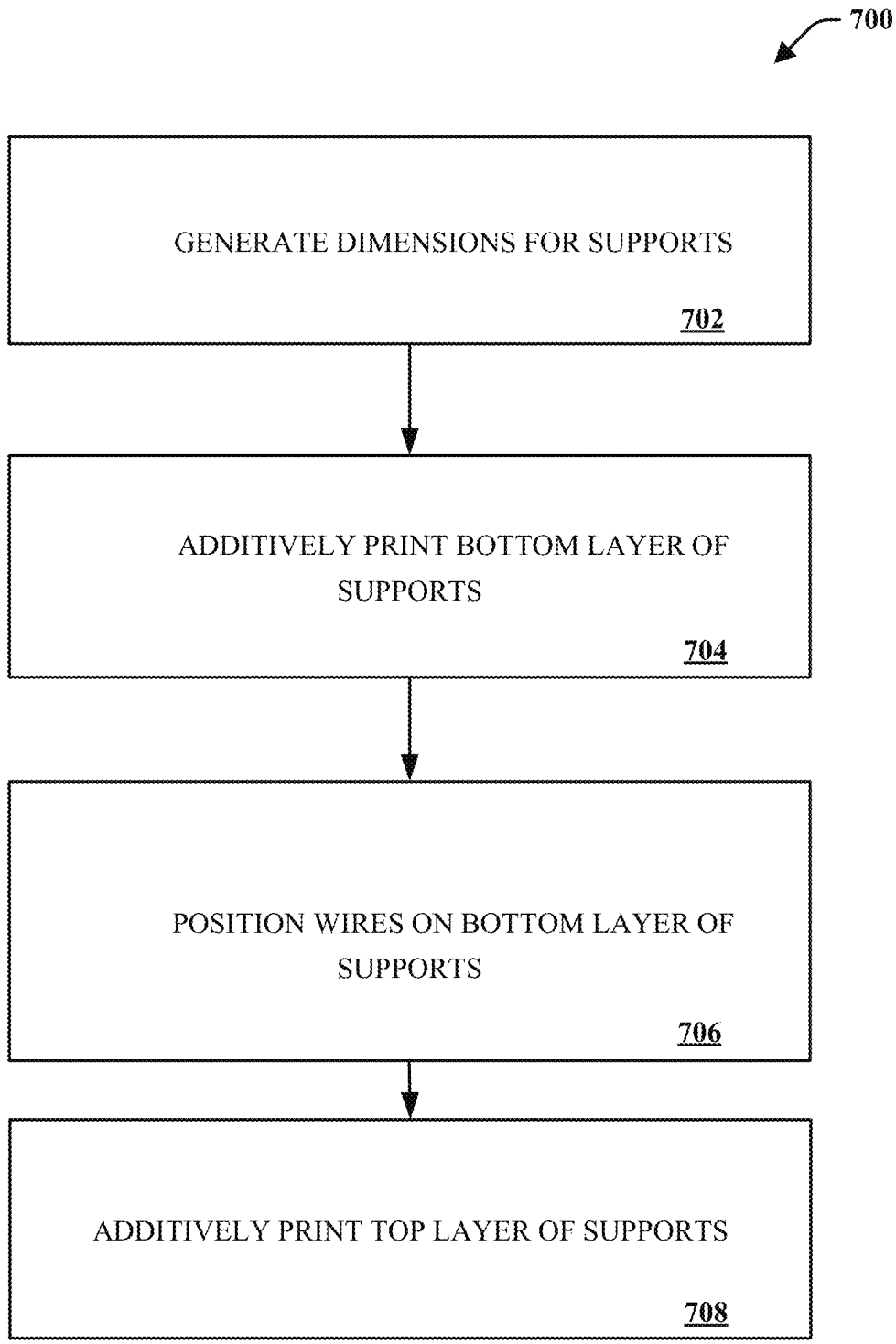
FIG. 7 is a flow-chart of a method of forming an additively printed self-cleaning screen in accordance with the present disclosure.

In view of the subject matter described herein, methods that may be related to various embodiments may be better appreciated with reference to the flowchart of FIG. 7. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 7 depicts an exemplary flowchart of non-limiting method 700 associated with an additive printing system (e.g., additive printing system 100, etc.), according to various aspects of the subject disclosure. As an example, method 700 may form or otherwise manufacture a self-cleaning screen (e.g., screen 200, 500, etc.). Further, method 700 may facilitate modification of self-cleaning screens by a user or a system.

At 702, a system (e.g., system 100) may generate dimensions for supports. This may include dimensions for horizontal supports, vertical supports or seals, and the like. The dimensions may include thickness, shapes, materials, or other physical aspects. As described herein, the dimensions may be modified via user specifications, artificial intelligence, or the like. Moreover, a system may generate a three-dimensional model that may communicate to or used to control an additive printer. It is further noted that reference 702 may be iterated to generate various models or screens.

At 704, the system may additively print a bottom layer of supports for a self-cleaning screen. Printing the bottom layer may include sending instructions to an additive printer to print the supports, receiving the instructions by the additive printer, and controlling an extruder to form the bottom layer. It is noted that one or more supports may be printed concurrently. Moreover, the bottom layer may comprise an appropriate thickness and dimensions as described herein.

At 706, one or more wires may be positioned on the bottom layers of supports. The wires may be positioned by a user or an automated process. The wires may comprise crimped wires arranged generally perpendicularly. It is noted that the wires may be positioned such that horizontal supports contact or otherwise support each wire.

At 708, the system may additively print top layers of supports. The top layer may include an outer surface. In some embodiments, the top layer may be printed to fill in any gaps or empty spaces within the bottom layer. It is noted, however, that some embodiments may include hollow or partially hollow supports. In another aspect, embodiments may include supports having apertures formed therethrough. Moreover, embodiments may include supports comprising a filler material or other material deposited within or between the bottom or top layers. For example, the system may deposit rubber or other materials within or on the bottom layer before forming the top layer. This may strengthen the supports, provide for shock absorption, or the like.

Figure 8:
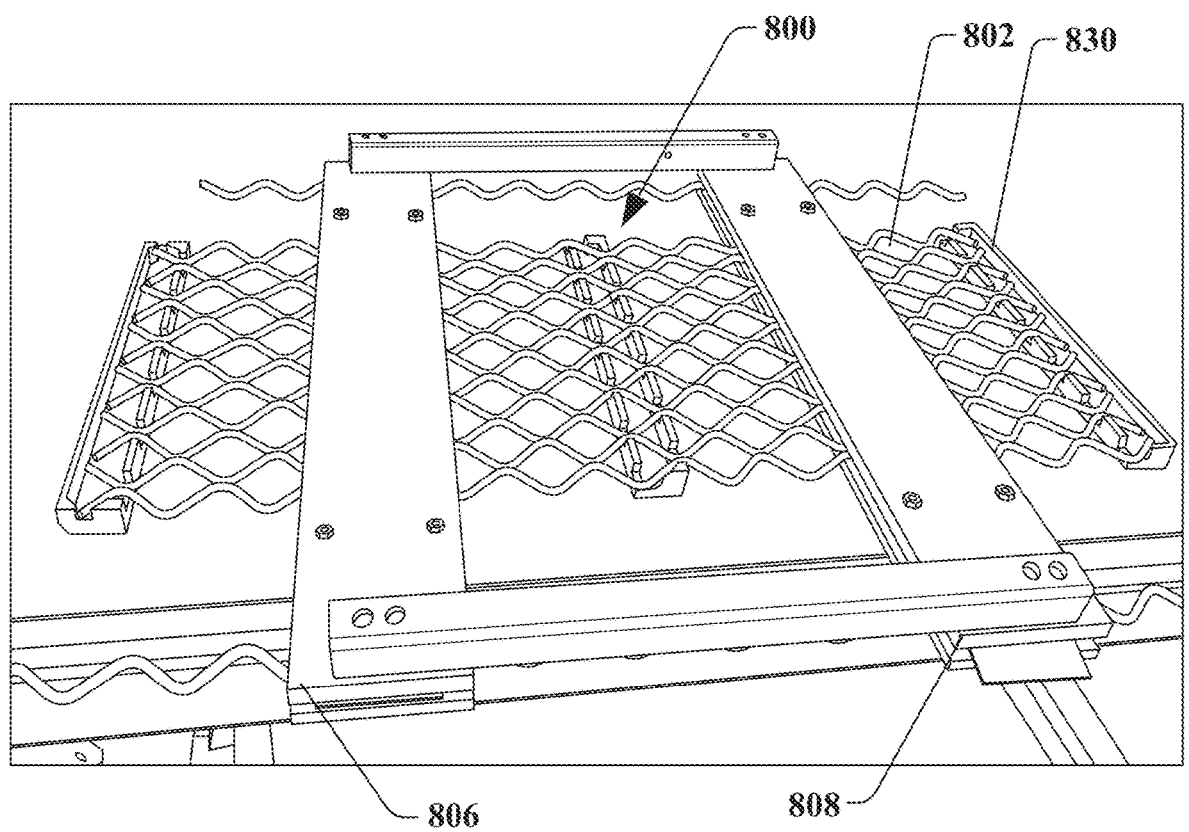
FIG. 8 is a view of a partially printed additively printed self-cleaning screen in accordance with the present disclosure.
Figure 9:
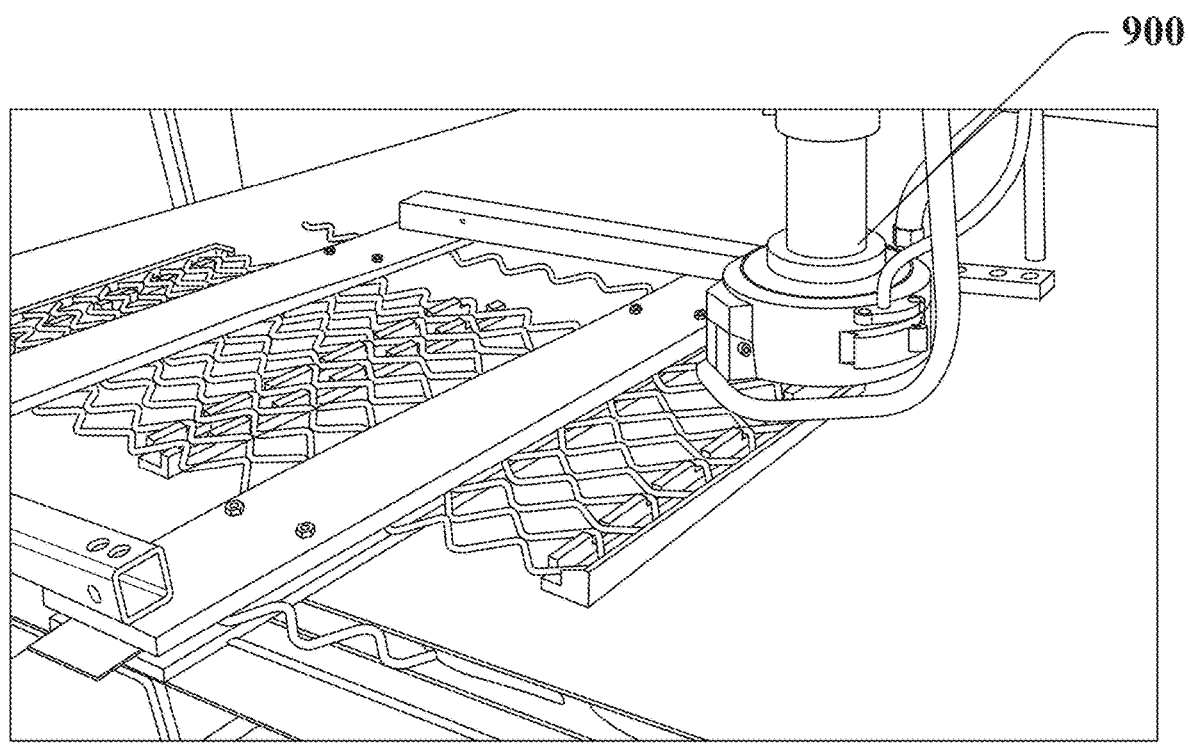
FIG. 9 is a view of a partially printed additively printed self-cleaning screen and an extruder in accordance with the present disclosure.

Turning to FIGS. 8-9, there depicted is an exemplary screen 800 during a manufacturing process. In FIG. 8, a bottom layer 830 has been formed via additive printing and wires 802 have been positioned on or within the bottom layer 830. Braces 806 and 808 are positioned to hold the wires 802 in position, such as for additive formation of a top layer. For example, FIG. 9 illustrates an extruder 900 depositing a top layer. It is noted that the top layer and the bottom layer 830 may comprise the same materials or different materials as each other.

FIGS. 10-13 illustrate cross-sectional views of embodiments of horizontal supports 1000, 1100, 1200, and 1300. FIG. 14 illustrates a cross-sectional view of a vertical support or seal 1400. It is noted that the supports may comprise different dimensions and materials. Moreover, the supports may be modified or modeled as described herein. Moreover, supports 1000, 1100, 1200, and 1300, and seal 1400 are depicted as an illustrative example. As described herein, the disclosed systems and methods allow for ease of customization and modification of self-cleaning screens. It is further noted that complex geometries may be created, tested, or otherwise employed.

Figure 10:
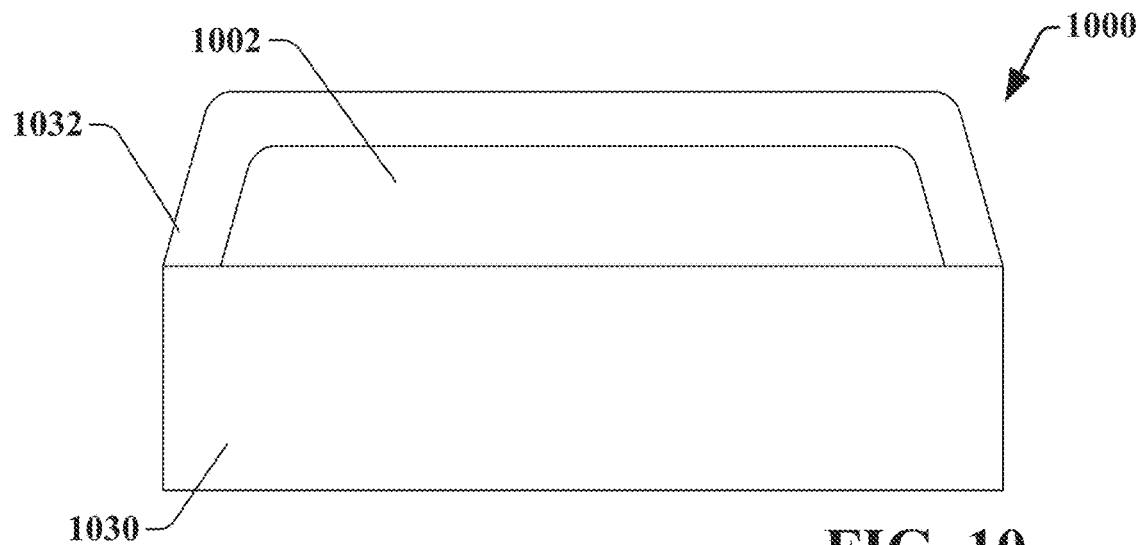
Figure 11:
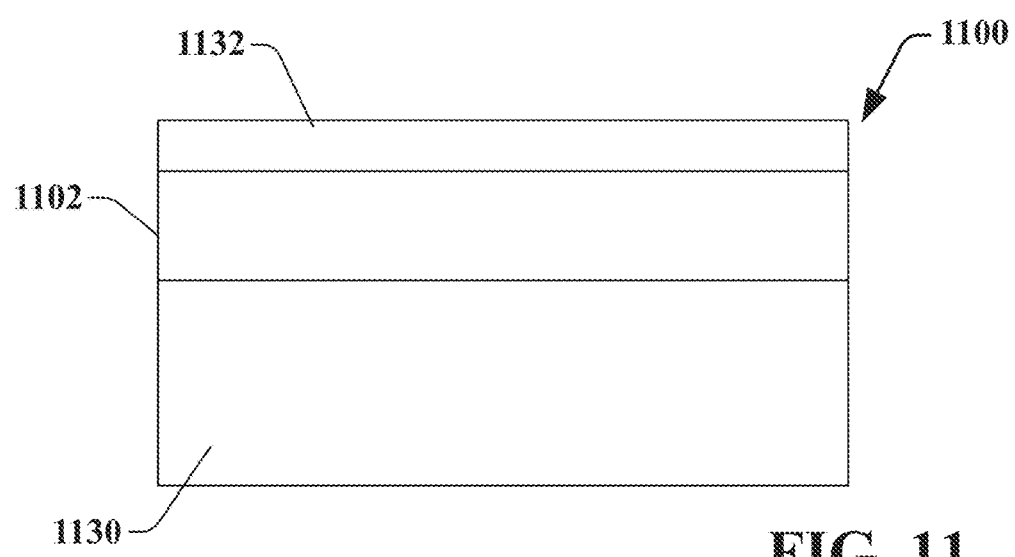
Figure 12:
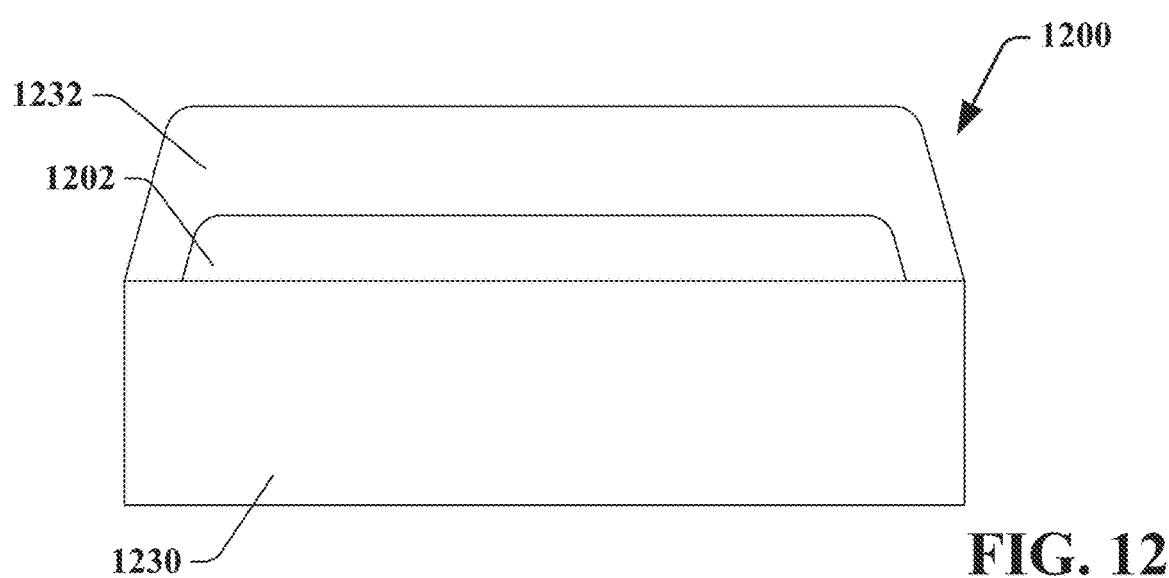

Each of the supports and seals may comprise a top layer 1032, 1132, 1232, 1332, and 1432. The top layers may comprise various sizes and shapes. It is noted that the top layers may be generally flat or planer (as shown in FIG. 11), curved (as shown in FIG. 13, pyramid shaped, angled, or the like. As shown in FIGS. 10 and 12, the top layers 1032 and 1232 may comprise angled sides that transition into curved shoulders and a generally flat top portion. It is noted that the top portions may comprise various other shapes, such as generally n-sided polygonal shapes (where n is a number), chamfered shapes, curved shapes, or the like. The bottom layers 1030, 1130, 1230, 1330, and 1430 are generally depicted as rectangular or flat portions. It is noted, however, that the bottom layers may comprise various shapes. The top and bottom layers generally surround or support a portion of a wire. It is noted that the thickness may decrease around ends of the supports and increase near a middle to assist in preventing or reducing wear.

In another aspect, the supports may comprise a middle or third layer 1002-1402. The third layer 1002-1402 may comprise a different material than the first or second layers. For example, the third layer 1002-1402 may comprise a relatively soft plastic, and first or second layers may comprise a harder plastic, such as polyurethane. Varying the thickness of the softer material may fine-tune the rebound qualities of the supports (e.g., the ability to take impact of the lager material) while the thin layer of hard Polyurethane keeps the wear resistance high.

In some embodiments, the third layer 1002-1402 may be deposited in a general center of the cross-section. This may comprise an area of impact that may be greatest, and varying the hardness may allow for increased overall performance of the support.

According to some examples, visual wear indicators may be utilized to identify the wear of supports. The visual indicators may comprise colored strips or layers of material at appropriate heights. As overlaying material is removed, the different colored strips may be viewable. This may provide a visual indication that material is worn and may signify a level of wear. For instance, two or more differently colored strips may be positioned at different heights. The color that is viewable may indicate a level of wear. In at least some embodiments, the layers of material could be conductive material, so the resistance raises with the remaining thickness or presence of the conductive layer. An additional electrical circuit in the supports may be provided for measuring conductivity.

According to some embodiments, the supports may include one or more sensors 1340, as shown in FIG. 13. The one or more sensors 1340 may be disposed in or about the support 1300. The sensors 1340 may comprise an appropriate type of sensor, such as motion sensors, light sensors, reed switches, or the like. In an example, the one or more sensors 1340 may comprise carbon nanotube (CNT)-based conductors arranged on a substrate to detect damage to the support 1300. For instance, CNT based sensors may be positioned in a matrix or otherwise positioned to detect damage to the support 1300. In some other examples, accelerometers or other motion sensors may be utilized to monitor motion during operation. A baseline may be established that signifies normal operation of an undamaged support 1300. Motion may be monitored to identify deviation from the baseline beyond an acceptable range. This may indicate that the support 1300 is damaged or a screen is otherwise reduced in operative capabilities.

It is noted that the sensors 1340 may communicate with a reader device. In at least some embodiments, the sensor 1340 may include or be coupled with a wireless tag, such as a radio frequency identification (RFID) chip, transponder, a near-field communications (NFC) chip, and the like. Such tags may comprise printable RFID tags, NFC tags, tags including microchips, or the like. Wireless tags can contain stored information, such as in a memory. In another aspect, the tag may be powered by electromagnetic induction from magnetic fields produced near a reader. For instance, a wireless tag may include an NFC chip that uses electromagnetic induction between two loop antennas located within the support's near field, effectively forming an air-core transformer. The antennas may comprise various materials, such as copper. While an air-core transformer is described, various other antenna formations may be utilized. The tag may be a passive transponder that collects energy from interrogating radio waves and/or may include a local power source such as a battery. As such, a tag and a reader may be configured as a passive reader active tag system, active reader passive tag system, an active reader active tag system, or the like.

As used herein, the terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor itself. Moreover, such terms may be localized to one computer and/or may be distributed across multiple computers.

While methods may be shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

What is claimed is:

1. A method of manufacturing a self-cleaning screen, comprising:
   generating a three-dimensional model for at least one support;
   transmitting instructions to an additive printer to form a first layer of the at least one support;
   positioning a plurality of wires on the at least one support; and
   transmitting instructions to the additive printer to form a second layer of the at least one support.

2. The method of claim 1, further comprising modifying the three dimensional model based on at least one of user instructions or a history of performance associated with the self-cleaning screen.

3. The method of claim 1, wherein the instructions that are transmitted to the additive printer to form the first layer and the second layer of the at least one support cause the additive printer to form the at least one support with an overlay.

4. The method of claim 1, wherein the at least one support comprises a horizontal support.

5. The method of claim 1, wherein the at least one support comprises a vertical support.

6. The method of claim 1, further comprising forming at least two second layers of different supports of the at least one support without moving the plurality of wires.

7. The method of claim 1, wherein the plurality of wires are arranged to provide gaps between the plurality of wires.

8. The method of claim 1, further comprising positioning at least one sensor in the at least one support.

9. The method of claim 8, wherein the at least one sensor monitors for damage to the at least one support.

10. The method of claim 1, further comprising transmitting instructions to the additive printer to form a third layer of the at least one support, wherein the third layer comprises a different material from the first and second layer.

11. A self-cleaning screen comprising:
    a plurality of wires operatively positioned generally parallel to each other, wherein the plurality of wires comprises a first major side, a second major side, a proximal end, and a distal end;
    at least one additively printed support extending from the first major side to the second major side; and
    at least one additively printed seal extending along at least one of the first major side and the second major side, wherein the at least one additively printed seal extends from the proximal end to the distal end.

12. The self-cleaning screen of claim 11, further comprising at least one fastener operatively positioned at the proximal end or the distal end.

13. The self-cleaning screen of claim 11, wherein the at least one additively printed support comprises a top surface comprising at least one of a curved or angled portion.

14. The self-cleaning screen of claim 11, wherein the at least one additively printed support comprises at least two different materials.

15. The self-cleaning screen of claim 11, wherein the at least one additively printed support comprises at least two different materials.

16. The self-cleaning screen of claim 11, further comprising a colored layer disposed within the at least one additively printed support, wherein the colored layer comprises a different color than other portions of the at least one additively printed support.

17. A self-cleaning screen comprising:
   a plurality of crimped wires; and
   a plurality of additively printed horizontal supports, wherein the additively printed horizontal supports comprise a bottom layer, a middle layer, and a top layer.

18. The self-cleaning screen of claim 17, wherein the top layer and the bottom layer comprise polyurethane.

19. The self-cleaning screen of claim 18, wherein the middle layer comprises a plastic material comprising a different stiffness as the top layer and the bottom layer.

20. The self-cleaning screen of claim 17, further comprising at least one side seal disposed along a major edge of the plurality of crimped wires.

* * * * *